United States Patent [19]

Zinn

[11] 4,030,519

[45] June 21, 1977

[54] VALVE COVER FOR BURIED VALVE, PERMITTING ACCESS THERETO

[75] Inventor: Frank R. Zinn, Culpeper, Va.

[73] Assignee: Bingham and Taylor, Culpeper, Va.

[22] Filed: Apr. 23, 1976

[21] Appl. No.: 679,748

[52] U.S. Cl. .............................. 137/364; 137/371
[51] Int. Cl.² ........................................ F16L 58/00
[58] Field of Search .......................... 137/363–373, 137/375

[56] References Cited

UNITED STATES PATENTS

| | | | |
|---|---|---|---|
| 3,548,864 | 12/1970 | Handley | 137/364 |
| 3,601,143 | 8/1971 | Glennon | 137/364 |
| 3,901,271 | 8/1975 | Stewart | 137/364 |

Primary Examiner—Robert G. Nilson

Attorney, Agent, or Firm—Cushman, Darby & Cushman

[57] ABSTRACT

A valve cover for covering a buried valve and permitting access thereto with a two piece, rigid plastic housing having a square cross section which resists rotation in the ground. The housing is capped with a cast iron collar which fits inside the top end of the housing and has apertures in the portions engaging the housing walls through which the plastic extends to lock the collar to the housing. Adjacent the lower end of the housing are opposing apertures in the housing walls through which the pipes extend from the valve. A plurality of fingers extend outward from the housing about each aperture to form a tapering passage which will accommodate different sizes of pipes.

8 Claims, 4 Drawing Figures

VALVE COVER FOR BURIED VALVE, PERMITTING ACCESS THERETO

BRIEF DESCRIPTION OF THE PRIOR ART AND SUMMARY OF THE INVENTION

The invention relates to a valve cover of the type which covers a valve buried in the earth and includes a housing extending upwardly therefrom to permit access to the valve from the surface.

Valve covers of this type are generally used wherever a buried valve is located in order to permit access to that valve without uncovering the same. Such covers usually constitute a elongated hollow housing capped at the upper end by a cast iron collar or the like with a cap which can be removed by a properly authorized person to permit access and to operate the valve, for example by a wrench. Such housings are conventionally constructed of metal, plastic, and other material. At the lower end of the housing the cover must have some provision for the two pipe sections which lead into and out of the valve to pass through the housing. This can be accomplished by providing a cut-out section, for example in the form of a arch or by a flexible arrangement which fits snugly about the pipe. The difficulty with an arch arrangement is that it does not fit snugly onto the pipe and can permit the housing to rotate. If a snug connection is used then different valve covers having different apertures must be manufactured and kept on hand for different pipe sizes.

Valve covers are also conventionally formed in round cross section. The difficulty with such shape is that the housing tends to rotate in the earth, for example as a wrench is applied to the valve.

The present invention relates to a unique valve cover which can be used with a variety of sizes of pipe. The cover includes a hollow elongated housing also known as a curb box which is preferably formed in two sections which are friction fitted together. The housing is preferably made of suitable rigid plastic and is formed in a square cross section which resists rotation. A cast collar is attached to and fits within the end of the housing which extends above or is flush with the ground. The cast collar is conventionally capped with a suitable cover which can be removed to permit access to the interior of the housing and the valve which is located at the opposite end of the housing.

The pipe sections which lead into and out of the valve extend through apertures in opposing walls of the housing adjacent the end opposite the capped end. About each of these apertures, a plurality of flexible fingers extend outward to form a tapering passage which accomodates the cover to a variety of pipe shapes and sizes. The flexible fingers can be taped or clamped to the pipe to lock the housing to the pipe. The cast collar is preferably attached to the plastic housing section by portions of the plastic housing which extend through apertures in the collar and which are forced through the apertures by heating the upper portion of the plastic housing and blowing portions of the plastic through the metal holes to provide a mechanical lock.

Other objects and purposes of the invention will be clear from the following detail description of the drawings.

DETAILED DESCRIPTION OF THE DRAWINGS

Figure 1:
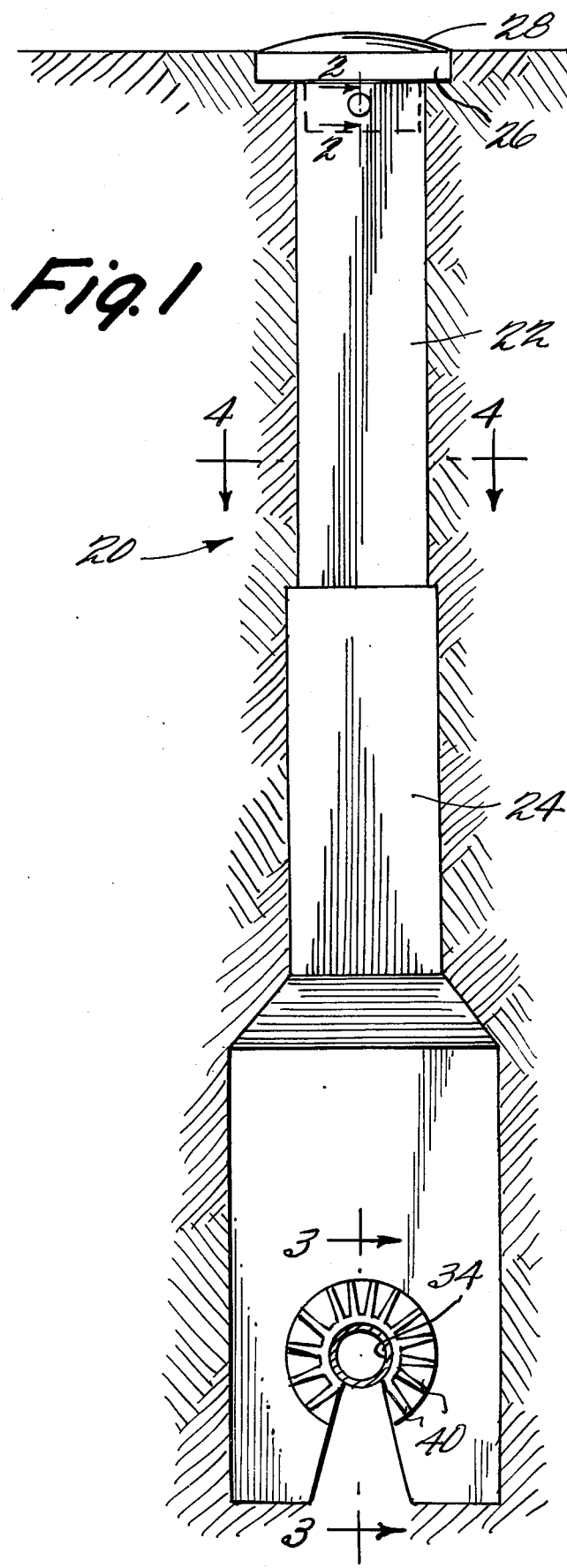
FIG. 1 shows an assembled view of the housing of this invention in place in the ground.
Figure 4:
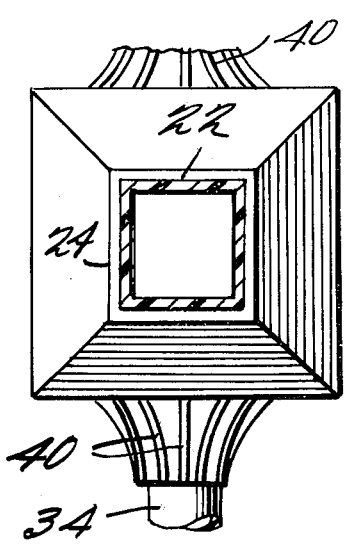
FIG. 4 shows a sectional view of FIG. 1 through the lines 4—4.

Reference is now made to FIG. 1 which shows an assembled view of the valve cover of this invention. The valve cover comprises a housing generally indicated as 20 which is made up of an upper section 22 and a lower section 24 which fit together as illustrated in a friction fit. Both sections have a square cross section as shown in FIG. 4 which resists rotation in the earth and both are formed from a suitable plastic material, for example extruded ABS plastic. In addition to resisting rotation, using a square cross section requires less material than a round configuration to permit a wrench of a given size to be used inside the housing.

A cast iron collar 26 caps the upper end of housing 22 and may be of any shape, for example round, square or the like. A cover 28 is attached to and closes the top of casting 26. Cover 28 can be removed by a suitably authorized person to operate the valve within the housing 20 by means of a suitable wrench.

Figure 2:
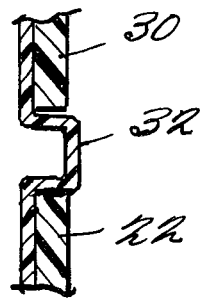
FIG. 2 shows a sectional view of FIG. 1 through the lines 2—2.

Collar 26 is attached to plastic housing section 22 in a simple and unique fashion as can be seen in detail/ in FIG. 2. Collar 26 is provided in each of the portions which engage the walls of the housing section 22 with a aperture, for example aperture 30 in FIG. 2. During fabrication the upper few inches of section 22 are heated and then the plastic material sucked through the metal holes by a vacuum applied with housing 20 to form an outwardly extending portion 32 which extends through aperture 30 and which locks the collar onto the section 22. Alternatively, the cast iron collar can be fitted snugly within the top top of housing section 22.

Figure 3:
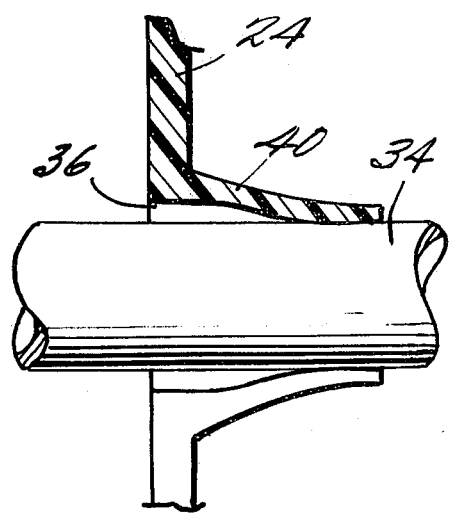
FIG. 3 shows a sectional view of FIG. 1 through the lines 3—3.

Adjacent the end opposite the top of housing 20 is a conventional valve is located within section 24 with pipe sections extending into and out of the valve through apertures in opposing walls of section 24. Referring to FIG. 1, pipe 34 extends outward through aperture 36 in section 24. About each of the opposing apertures a plurality of resilient fingers are attached at one end to housing 20 and extend outwardly therefrom as can be seen best in FIG. 3 to form a tapering passage which will accomodate a variety of sizes of pipes and which will hold the pipe in position. These resilient fingers 40 can be clamped or taped to the pipe 34 to securely lock the pipe to the housing. Preferably these fingers are formed of resilient plastic or any other suitable material may be used for the purposes.

Many changes and modifications of the above described embodiment of the invention can, of course, be carried out without departing from the scope thereof. Accordingly, that scope is intended to be limited only by the scope of the appended claims.

What is claimed is:

1. A valve cover for covering a buried valve and permitting access thereto comprising:
   a hollow elongated housing member having opposed apertures adjacent one end thereof for each receiving a pipe section which extends therethrough with a valve between said sections being within said housing, a cast collar attached to and covering at the opposite end of said member for permitting access to said valve when said housing and valve are in place, and a plurality of flexible fingers each attached at one end to said housing about each of said apertures and extending outward therefrom to engage a pipe section to define a tapering passage for locking said valve and pipe sections securely to said cover.

2. A valve cover as in claim 1 wherein said housing member has to square cross section to prevent rotation of said cover in the ground.

3. A valve cover as in claim wherein said housing member is formed of rigid plastic.

4. A valve cover as in claim 1 wherein said fingers are formed of resilient plastic.

5. A valve cover as in claim 1 wherein said collar is cast iron.

6. A valve cover as in claim 1 wherein said collar has a plurality of apertures in a region engaging the interior of said housing near the top thereof and said housing has inwardly extending portions extending into said collar apertures.

7. A valve cover as in claim 1 wherein said housing member is formed in two sections held together by a friction fit.

8. A valve cover for covering a buried valve and permitting access thereto comprising:

a rigid, plastic hollow elongated housing member having a square cross section with four walls for preventing rotating of said cover in the ground having opposed apertures in opposing walls adjacent one end thereof for each receiving a pipe section which extends therethrough with a valve between said sections being within said housing, a cast collar attached to and covering at the opposite end of said member for permitting access to said valve when said housing and valve are in place, said collar having a plurality of apertures in portions thereof engaging corresponding walls of said housing member with portions of said housing extending through said apertures to lock said collar to said housing, and a plurality of flexible, plastic fingers each attached at one end to said housing about each of said apertures and extending outward therefrom to engage a pipe section to define a tapering passage for locking said valve and pipe sections sections securely to said cover.

* * * * *